(12) United States Patent
Schouviller et al.

(10) Patent No.: US 11,673,058 B2
(45) Date of Patent: Jun. 13, 2023

(54) DATA TRANSPORT OF ENCRYPTION KEY USED TO SECURE COMMUNICATION BETWEEN COMPUTING DEVICES

(71) Applicant: Microsoft Technology Licensing, LLC, Redmond, WA (US)

(72) Inventors: Kyle Schouviller, New Castle, WA (US); Scott Guest, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 186 days.

(21) Appl. No.: 17/182,743

(22) Filed: Feb. 23, 2021

(65) Prior Publication Data

US 2021/0170280 A1 Jun. 10, 2021

Related U.S. Application Data

(63) Continuation of application No. 16/510,823, filed on Jul. 12, 2019, now Pat. No. 10,960,314.

(51) Int. Cl.
*A63F 13/71* (2014.01)
*H04L 9/40* (2022.01)

(52) U.S. Cl.
CPC .......... *A63F 13/71* (2014.09); *H04L 63/0442* (2013.01); *H04L 63/062* (2013.01); *H04L 2463/062* (2013.01)

(58) Field of Classification Search
None
See application file for complete search history.

(56) References Cited

U.S. PATENT DOCUMENTS

| 11,477,188 | B2* | 10/2022 | Duchastel | ........... H04L 63/0815 |
| 2021/0392136 | A1* | 12/2021 | Modi | ..................... H04L 9/3234 |
| 2022/0217124 | A1* | 7/2022 | Fryer | ...................... H04L 63/10 |

* cited by examiner

*Primary Examiner* — Ronald Laneau (57) ABSTRACT

The present disclosure relates to processing operations configured to efficiently enable a client and a server to establish secure communication upon initial connection between the client and the server. Upon initial connection to with the server, the client provides an encrypted token which serves as both proof of authentication/identity and provides, in the encrypted token, an encryption key that the server can utilize to initiate secure communication with the client. The server is able to trust the encrypted token and the encryption key because the encrypted token is signed and encrypted by an authentication service that has a trusted relationship with the server and because the authentication service has pre-shared decryption and signature verification keys with the server. The server utilizes the encrypted key to secure communications with the client without requiring additional processing to lookup client identity or any further intervention from the authentication service.

20 Claims, 3 Drawing Sheets

DATA TRANSPORT OF ENCRYPTION KEY USED TO SECURE COMMUNICATION BETWEEN COMPUTING DEVICES

CROSS REFERENCE TO RELATED PATENT APPLICATIONS

This application is a continuation of and claims priority to U.S. Non-Provisional patent application Ser. No. 16/510,823 entitled "DATA TRANSPORT OF ENCRYPTION KEY USED TO SECURE COMMUNICATION BETWEEN COMPUTING DEVICES", filed on Jul. 12, 2019, which is hereby incorporated by reference herein, in its entirety.

BACKGROUND

Interaction between a client and an application/service is often secured using authentication, cryptography or a combination thereof. Typically, a client must be authenticated to access domain specific data of an application/service. In today's world, time is of the essence, where processing efficiency and reduction of latency are paramount when authenticating a user as well as executed operations during run-time of an application/service that may include encrypted data. This is especially true when a client is interacting with an application/service that is configured to provide a video game platform or the like, for example, that may enable users to connect to online multiplayer games. In such an environment, large amounts of data are transmitted and need to be processed instantaneously to provide a user with a best possible experience.

If a client is communicating with an application/service, the application/service needs to know the client it is dealing with. A client logs into an application/service providing client identification. Traditionally, once that client is authenticated, the application/service needs to not only execute processing to initiate connection with the client, but also execute lookup operations for client identification as well as correspond that client identification with cryptographic data. This process is cumbersome from a processing efficiency standpoint, creates latency in execution of an application/service and often requiring an identity provider and/or software platform to dedicate extra computing resources and bandwidth to managing interaction between not only the client and application/service but also with a certification authority (CA). For instance, digital certificates are often issued to enable clients to interface with an application/service once authenticated, which requires not only a trusted CA but management also requires significant computing resources such as dedicated storage.

Additional security vulnerabilities may exist in instances where digital certificates are utilized. For instance, a period of time in which a digital certificate is valid is often longer than is preferred for usage in a gaming application/service scenario. Users do not typically stay logged in for long periods of time. If a digital certificate is valid for a period of time that is longer than a users' current session, this can open up a network to vulnerabilities including spoofing. To continuously re-issue digital certificates is able cumbersome and requires more dedicated storage and computing resources to continuously manage.

SUMMARY

In view of the foregoing technical challenges, the present disclosure relates to processing operations configured to efficiently enable a client and a server to establish secure communication upon initial connection between the client and the server. Upon initial connection to with the server, the client provides an encrypted token to the server, where the encrypted token serves as both proof of authentication/identity and provides, in the encrypted token, an encryption key that the server can utilize to initiate secure communication with the client. The server is able to trust the encrypted token and the encryption key because the encrypted token may be encrypted and signed by an authentication service that has a trusted relationship with the server and because the authentication service has pre-shared decryption and signature verification keys with the server. The server utilizes the encrypted key to secure communications with the client without requiring additional processing to lookup client identity or any further intervention from the authentication service.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

The present disclosure relates to processing operations configured to efficiently enable a client and a server to establish secure communication upon initial connection between the client and the server. Upon initial connection to with the server, the client provides to the server an encrypted token which serves as both proof of client authentication/identity and provides, in the encrypted token, an encryption key that the server can utilize to initiate secure communication with the client. The server is able to trust the encrypted token and the encryption key because the encrypted token may be encrypted and signed by an authentication service that has a trusted relationship with the server and because the authentication service has pre-shared decryption and signature verification keys with the server. The server then utilizes the encrypted key to secure communications with the client without requiring additional processing to lookup client identity or any further intervention from the authentication service. The present disclosure relates to the interactions between a client, a server, an authentication service, or any combination thereof, where claim coverages may be written from the perspective of any of the client, the server, the authentication service or a system that comprises one or more thereof, without departing from the spirit of the present disclosure.

Some examples described herein relate to client/server relationships, where a client, through a gaming console, is connecting to a distributed gaming platform that provides applications/services to enable the client to connect to gaming server(s). For instance, encryption key data may pertain to encrypted game-server keys for establishing a connection between a client and server that wishes to communicate to execute a gaming application/service. However, the present disclosure is not so limited. Processing described herein is applicable to any type client/server relationship operating in any type of application/service scenario. Moreover, technical examples described herein may pertain to client login for a single application/service as well as single-sign-on (SSO) examples where a login is utilized to access a plurality of different applications/services. Furthermore, examples of the present disclosure are applicable to both symmetric key and asymmetric key cryptography.

In one example, a client device may transmit user authentication information for login to an application or service. Login for the client device may be directed to an authentication service. An exemplary authentication service is configured to implement one or more protocols that manage security for a client/server relationship, where the authentication service is an intermediary for authenticating client access to applications/services. The authentication service may determine whether to authenticate the client device based on an evaluation of the user authentication information. In response to an authentication of the user authentication information, the authentication service is configured to dynamically generate an encryption key for communications between the client/server as well as dynamically generate (and sign) an encrypted token associated with client access to an application or service. The encrypted token comprises, in the payload, the dynamically generated encryption key. The authentication service transmits the encryption key and the encrypted (and signed) token to the client device. Subsequently, the client device receives said encryption key and encrypted token and then forwards the encrypted token to the application or service (e.g., a server component of the application/service) to initiate a connection with the application or service. The authentication service is further configured to pre-share, with the server, a decryption key for decrypting the encrypted token that is received from the client device. In examples where the encrypted token is also signed by the authentication service, a signature verification key is pre-shared with the server from the authentication service. A server of the application or service is configured to decrypt the encrypted (and signed) token using the decryption key (and the signature verification key). The server is then configured to parse the contents of the decrypted token and extraction the encryption key. The server may utilize the encryption key to initiate secure communications that occur directly with the client device, where the client device already is in possession of the encryption key (that was pre-shared by the authentication service).

As referenced above, the present disclosure pertains to cryptography scenarios that comprise symmetric key encryption/decryption as well as asymmetric key encryption/decryption. In symmetric key examples, the authentication service pre-share an encryption key with the client device that is the same encryption key that is included in the payload of the encrypted token. In asymmetric key examples, the authentication pre-shares one or more key pairs with a client component and a server component.

Further examples pertain to interaction with one or more servers of an application/service. For example, a server component (e.g., server device) receives, from the authentication service, a pre-shared decryption key for decrypting the encrypted token that is forwarded from a client device. In examples where the encrypted token is also signed by the authentication service, a signature verification key is pre-shared with the server component from the authentication service. Subsequently, the server component receives, from a client device, the encrypted (and signed) token that comprises an encryption key (or key pair) usable to secure direct communications with a client device. The server component is then configured to decrypt the encrypted (and signed) token using the pre-shared decryption key (and pre-shared signature verification key) and extract the encryption key from the payload of the decrypted token. The server component then initiates a connection with the client device and transmits a secure communication to the client device using the extracted encryption key. For example, the server component is configured to encrypt a communication to the client device using the extracted encryption key and transmit the secure communication to the client device. The client device was pre-shared an encryption key (or key pair) to be able to securely communicate with the server component. In some examples, the server device may be configured to launch a communication channel, specific to interactions with authenticated client devices, for transmission of the secure communications.

Additional examples pertain to interactions of an authentication service with client and/or server components. For instance, the authentication service may pre-share, with a server component, decryption and signature verification keys for decrypting an encrypted and signed token that is subsequently received. The authentication service authenticates client credentials for login to an application/service and dynamically generates an encryption key (or keys, key pair, etc.) as well as an encrypted and signed token for client authentication to the application/service. In one example, a new encryption key and/or encrypted token is generated when client authentication information is received and authenticated by the authentication service. For instance, this may occur when a client has logged off the application/service and is required to reauthenticate. As such, authentication of a client identity is a trigger for dynamic generation of an encryption key such as an encryption key that is usable to secure communications between a client component and a server component. This processing enables the authentication service to remove itself from a process for creating secure communications that occur directly between a client component and a server component by creating a trusted relationship with each entity. For instance, the server can trust an encrypted token that is received from a client device because it has pre-shared decryption and signature verification keys.

In non-limiting examples, an encryption key and/or encryption token may last the term of a client login session. For instance, a client device may login to a distributed gaming service and engage in an online multiplayer session for a game, where the client/server may communicate through secure messaging to enable execution of the online multiplayer game including private messaging capabilities for client devices that are engaged in the online multiplayer session. A client device may disconnect from the distributed gaming service voluntarily or be logged out automatically after a predetermined idle period. In some alternative examples, associated encryption keys and/or encrypted tokens may also be pre-determined to expire at a designated point in time to avoid unintended access to client accounts and server interaction. In any case, the client device may be required to reauthenticate when it is disconnected from a server component. This is a trigger for dynamic generation of a new encryption key and/or encrypted token, enabling the server to securely communicate with the client in a new session.

Exemplary technical advantages provided by processing described in the present disclosure comprise but are not limited to: dynamic generation and provision of encryption keys and encrypted tokens based on client authentication for a purpose of securing communications between a client and a server; pre-sharing of an encryption key usable to establish secure communications between a client and server; pre-sharing of decryption and signature verification keys through an authentication service to enable a server to decrypt an encrypted and signed token; generation and propagation of customized encrypted (and signed) tokens that can be configured to include customized claims with an encryption key, among other types of data, included as a claim in a payload of the token; enhancement of processing efficiency during initiation of a connection between a client and server for execution of applications/services; improved processing efficiency (e.g., reduction in processing cycles, saving resources/bandwidth) for computing devices when initiating a connection between a client and server and establishing secure communication therebetween; reduction in latency when achieving secure communication between a client and server; ability to send secure communications directly between a client and a server as well as optionally highlight, through a graphical user interface of an application/service, that communications are secure; interoperability to implement the described technical security scenarios across a plurality of applications/services (e.g., applications/services of a software application platform); and improving usability of applications/services for users, among other technical advantages.

Figure 1:
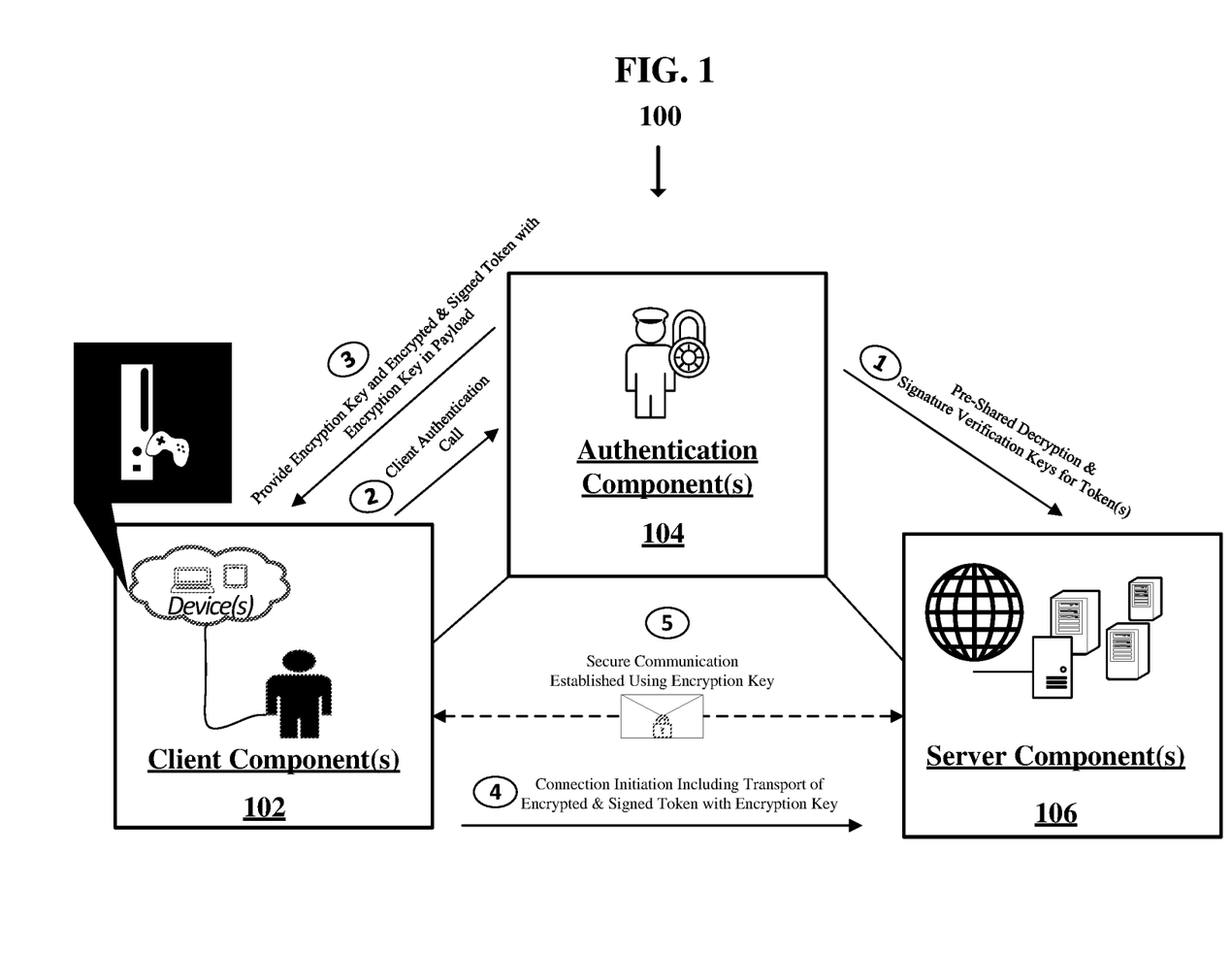
FIG. 1 illustrates an exemplary process flow of an interaction between components that enable secure transmission of communications between computing devices, with which aspects of the present disclosure may be practiced.

FIG. 1 illustrates an exemplary process flow 100 of an interaction between components that enable secure transmission of communications between computing devices, with which aspects of the present disclosure may be practiced. As an example, components illustrated in process flow 100 may be executed by an exemplary computing system (or computing systems) as described in the description of FIG. 4. Exemplary components, described in process flow 100, may be hardware and/or software components, which are programmed to execute processing operations described herein. In some examples, components of process flow 100 may each be one or more computing devices associated with execution of a specific service. Exemplary services may be managed by an application platform that also provides, to a component, access to and knowledge of other components that are associated with applications/services. In one instance, processing operations described in process flow 100 may be implemented by one or more components connected over a distributed network. Operations performed in process flow 100 may correspond to operations executed by a system and/or service that execute computer programs, application programming interfaces (APIs), neural networks or machine-learning processing, language understanding processing, search and filtering processing, and generation of content for presentation through a user interface of an application/service, among other examples. In exemplary illustrations of process flow 100, there are process flow steps (1-5) that are aimed at emphasizing non-limiting examples of interaction between components shown in FIG. 1. Process flow steps 1-5 are non-limiting examples of interactions between the client component(s) 102, the authentication component(s) 104 and the server component(s) 106. Process flow 100 comprises: one or more client components 102; one or more authentication components 104; and one or more server components 106. Exemplary components of process flow 100 may be connected via a network connection, where data (including secured data) is transmitted over a network connection as known to one skilled in the field of art. Moreover, process flow 100 between components may be altered without departing from the spirit of the present disclosure. Further, process flow 100 describes components that may be utilized to execute method 200 (FIG. 2) and the accompanying description.

The one or more client components 102 (hereinafter "client component") may comprise any of software components, hardware components or a combination thereof. For instance, the client component 102 is a collection of computer programs and/or computing devices that enable users to access one or more applications/services, which are made available via the one or more server components 106 (hereinafter "server component"). Client configurations and operation of client components to enable functionality described herein are known to one skilled in the field of art. Client component 102 may comprise a client device that a user may utilize to communicate with the server component 106. A client device may be a single apparatus, system, or device or may be implemented in a distributed manner as multiple apparatuses, systems, or devices. Non-limiting examples of client devices comprise but are not limited to: smart phones, laptops, tablets, PDAs, desktop computers, servers, smart computing devices including television devices and wearable computing devices, e-reader devices, gaming consoles and conferencing systems, among other non-limiting examples. As reference above, a client device may be a gaming console that a user utilizes to connection to a distributed gaming platform (e.g., XBOX® LIVE®). For example, a client device may connect with a server to initiate an online multiplayer session for a game, where data transmission may be secured between the client device and the service to enable the online multiplayer session. A client device may connect to the distributed gaming platform via a network connection, where the distributed gaming platform may be configured to connect a user with not only gaming-related applications/services but also any other type of application/service, for example, that is accessible via network connection. The client component 102 interfaces with the server component 106 and one or more authentication components 104 (hereinafter "authentication component") for secure transmission of data that enables initiation of a connection between a client device and a server and subsequent secure communication transmission during operation of one or more applications/services.

The authentication component 104 may comprise any of software components, hardware components or a combination thereof. For instance, the authentication component 104 is a collection of computer programs and/or computing devices that provide functionality that comprises but is not limited to: authenticating a client component 102 for access to one or more applications/services provided by the server component 106; managing the sharing of security data (e.g., encryption keys, decryption keys and signature verification keys) including pre-sharing of security data with the client component 102 and the server component 106; managing the creation, encryption and signing of tokens that comprise data to be transmitted over a network connection; dynamic generation and applicability of encryption and decryption keys used to initiate connections and secure communication between a client and server; and managing a validity state of encryption keys and/or encrypted tokens, among other examples. Authentication service configurations and operation of authentication components to enable functionality described herein are known to one skilled in the field of art.

The server component 106 may comprise any of software components, hardware components or a combination thereof. For instance, the server component 106 is a collection of computer programs and/or computing devices that provide functionality for clients to access one or more applications/services via the server component 106. Server configurations and operation of server components to enable functionality described herein are known to one skilled in the field of art. As identified above, the server component 106 interfaces with the client component 102 and the authentication component 104 for secure transmission of data that enables initiation of a connection between a client device and a server and subsequent secure communication transmission during operation of one or more applications/services. For instance, the server component 106 is configured to interface with the authentication component 104 to receive pre-shared decryption and signature verification keys for decryption of an encrypted and signed token that is created by the authentication component 104. The server component 106 is further configured to receive an encrypted token from a client component 102 that wishes to gain access to an application/service that is managed by the server component 106. The server component 106 may decrypt and parse the transmitted token to obtain the necessary data to enable a client device to connection to a server (e.g., game server) as well as access the encryption key that is usable to secure communications. Additionally, the server component 106 is further charged with initiating a connection to an application/service for an authenticated client and managing transmission of secure communications with the authenticated client. In some examples, transmission of secure communications between a client and server may occur over communication channel that is created by the server component 106 to manage communications with one or more specific client devices. For instance, secure communications may be sent to one or more client devices via a communication channel dedicated to two-way communication with client devices. In some instances, a secure communication channel may further be utilized to enable authenticated client devices to communicate amongst themselves, for example, via the server component 106. For instance, a plurality of client devices may be engaged in an online multiplayer game through a distributed gaming platform, where messaging functionality for the online multiplayer game may be enabled through the secure communication channel.

Turning to the process flow steps (labeled 1-5 in FIG. 1) of process flow 100, flow initiates at process flow step 1, where the authentication component 104 is configured to pre-share, with the server component 106, decryption and signature verifications keys that are utilized to decrypt an encrypted and signed token. During subsequent processing of process flow 100, the server component 106 is configured to utilize the pre-shared decryption and signature verifications keys to decrypt the encrypted token as well as verify the signature on the encrypted token to ascertain that the token has not been modified since generation. In at least one example, the authentication component 104 is configured to dynamically generate decryption and/or signature verification keys prior to client authentication processing. As such, pre-share decryption and signature verification keys may be applicable to validation of multiple connecting clients. In some alternative examples, the authentication component 104 may be configured to generate pre-shared keys for an individual client scenario. As an alternative example, when a client device is authenticated and an encryption key, that is usable for securing communications between a client and server, is dynamically generated, the authentication component 104 may be configured to dynamically generate and pre-share, with the server component 106, decryption and signature verification keys that are applicable to manage a specific client authentication scenario.

Flow may proceed to process flow step 2, where a client authentication call is initiated by the client component 102. The client authentication call may be a request to authenticate a client device for login to an application/service (e.g., a distributed gaming platform or distributed gaming service). As an example, a user may access a graphical user interface of an application/service via their client device (e.g., gaming console). The user may enter their login credentials (e.g., client authentication information) for access to the application/service (or a software application platform providing access to a plurality of applications/services) through the graphical user interface. When the user submits their credentials for authentication, the client authentication call may be propagated to the authentication component 104, that is executing an authentication service, to manage secure data transmission on behalf of the client component 102 and the server component 106.

At that point, the authentication component 104 evaluates the client authentication information and determines whether or not to validate a user for access to an application/service. In examples where the client authentication information is found to be valid (i.e. the user is authenticated) the authentication component 104 is configured to dynamically generate an encryption key (or key pair) that is usable for securing data transmission between the client and the server. That is, authentication of client authentication information is a trigger for generating an encryption key. As referenced above, the present disclosure pertains to cryptography scenarios that comprise symmetric key encryption/decryption as well as those which utilize asymmetric key encryption/decryption. In symmetric key examples, the authentication component 104 may generate a single encryption key that is used by the client component 102 and the server component 106 to secure communications therebetween. In asymmetric key examples, the authentication component 104 may generate one or more keys for usage by a specific entity (e.g., a key pair) that is propagated to the server component 106. Processing operations for generating encryption keys are known to one skilled in the field of art.

Furthermore, the authentication component 104 is further configured to dynamically generate a data token to represent the authenticated client. A data token is container for data to be transmitted between components, applications/services, etc., over a network connection. As a non-limiting example, the data token may be a JavaScript Object Notation (JSON) token due to its integration extensibility. However, it is to be understood that the present disclosure is configured to work with any type of data token, which may be generated in any format as known to one skilled in the field of art without departing from the spirit of the present disclosure. In one example, the JSON token is JSON web encryption (JWE) token (e.g., an encrypted token). The encrypted token (e.g., JWE token) is used to encrypt transmitted data as well as make it integrity protected. For instance, man-in-the-middle attacks cannot see or modify the data of the JWE token without having a verification fail. This helps the client component 102 and the server component 106 trust the JWE issued by the authentication component 104.

In some examples, a further layer of security is added by digitally signing the JWE token upon creation. A digital signature may be verified by the server component 106 when the server component 106 receives an encrypted and signed token that corresponds to a client authentication. The encrypted token may be encrypted and signed by the authentication component 104 to secure the data of the data token from being tampered with as well as make data opaque to the client such as sensitive data that is not meant to be viewed by the client or other unintended parties. Processing for generating, signing and encrypting a token such as a JWE token (e.g., JSON web signature and JSON web encryption) is known to one skilled in the field of art and is not specifically detained herein. In this case, the encrypted token is used to: 1) verify that a client is authenticated to access an application/service associated with the server component 106, including an indication that the data token is valid, as well as 2) provide a container for transported data including data (e.g., client identification and an encryption key) to enable the server component 106 to securely interface with the client component 102.

Data fields that are populated in the encrypted (and signed) token are referenced as data claims. Data claims may be included in a payload of the data token. Data claims may comprise registered claims, public claims and private claims, among non-limiting examples. Outside what data fields are mandatory for data transmission, developers may customize the data fields included in the encrypted token without departing from the spirit of the present disclosure. Among other types of data fields, registered claims may comprise data including but not limited to: token issuance; subject of the token; lifetime of the token including expiration information; and creation time, among other non-limiting examples as known to one skilled in the field of art. Public claims define data fields related defining name, domain, namespace, etc., among other non-limiting examples as known to one skilled in the field of art. Private claim fields may be defined customized define by the parties transmitting data, for example, where developers of the application/service may incorporate application or service specific data for transmission to aid operation. In one example, the private claims may comprise data such as client identification information (e.g., user IDs, user roles and other related information), data to initiate a connection between the client component 102 and the server component 106 and game-server specific data for execution of applications/services related to a distributing gaming platform, among other examples. In one example, the encryption key, that is usable for securing data transmission between the client and the server, is included in a private claim of the payload of the encrypted token. However, examples of the present disclosure are not so limited as the encryption key may be included in any type of claim of the encrypted data token.

Flow of process flow 100 may proceed to processing step 3, where the generated encryption key and the encrypted and signed token is transmitted from the authentication component 104 to the client component 102. The client component 102 may be configured to present the encrypted and signed token to the server component 106 when the client component 104 access an exemplary application/service. In actual implementation, possession of the encrypted (and signed) token may not be apparent to a client as possession and forwarding of the data token to the server component 106 may be the result of back-end processing.

Flow of process flow 100 may proceed to processing step 4, where the encrypted and signed token is forwarded by the client component 102 to the server component 106. This is an indication that the client component 102 is initiating a connection with an application/service provided via the server component 106. As referenced in the foregoing description, the server component 106 is configured to utilize the pre-shared decryption and signature verification keys to decrypt the encrypted and signed token. The server can trust an encrypted and signed token that is received from a client device and utilize the encrypted token to establish secure direct communication with the client if the encrypted token has not been modified and the signature is verified. The server component 106 is then configured to parse the contents of the decrypted token and extraction the encryption key from the payload (e.g., claims) of the decrypted token.

Processing of process flow 100 may proceed to process flow step 5, where the server component 106 utilizes the encryption key to initiate secure communications that occur directly with the client component 102. As identified in the foregoing description, the client component 102 is already is in possession of the encryption key (that was pre-shared by the authentication service) at process flow step 3. Processing operations for initiation of a connection between a client/server including generating secure communications is known to one skilled in the field of art. In some examples, the server component 106 may be configured to launch a communication channel, specific to interactions with authenticated client devices, for transmission of the secure communications between a client and a server. In this way, the client component 102 may communicate directly with the server component 106 in a secure environment that is created through interaction with a trusted source and in a secure manner that greatly increases the difficulty for hackers to obtain unauthorized access.

Figure 2:
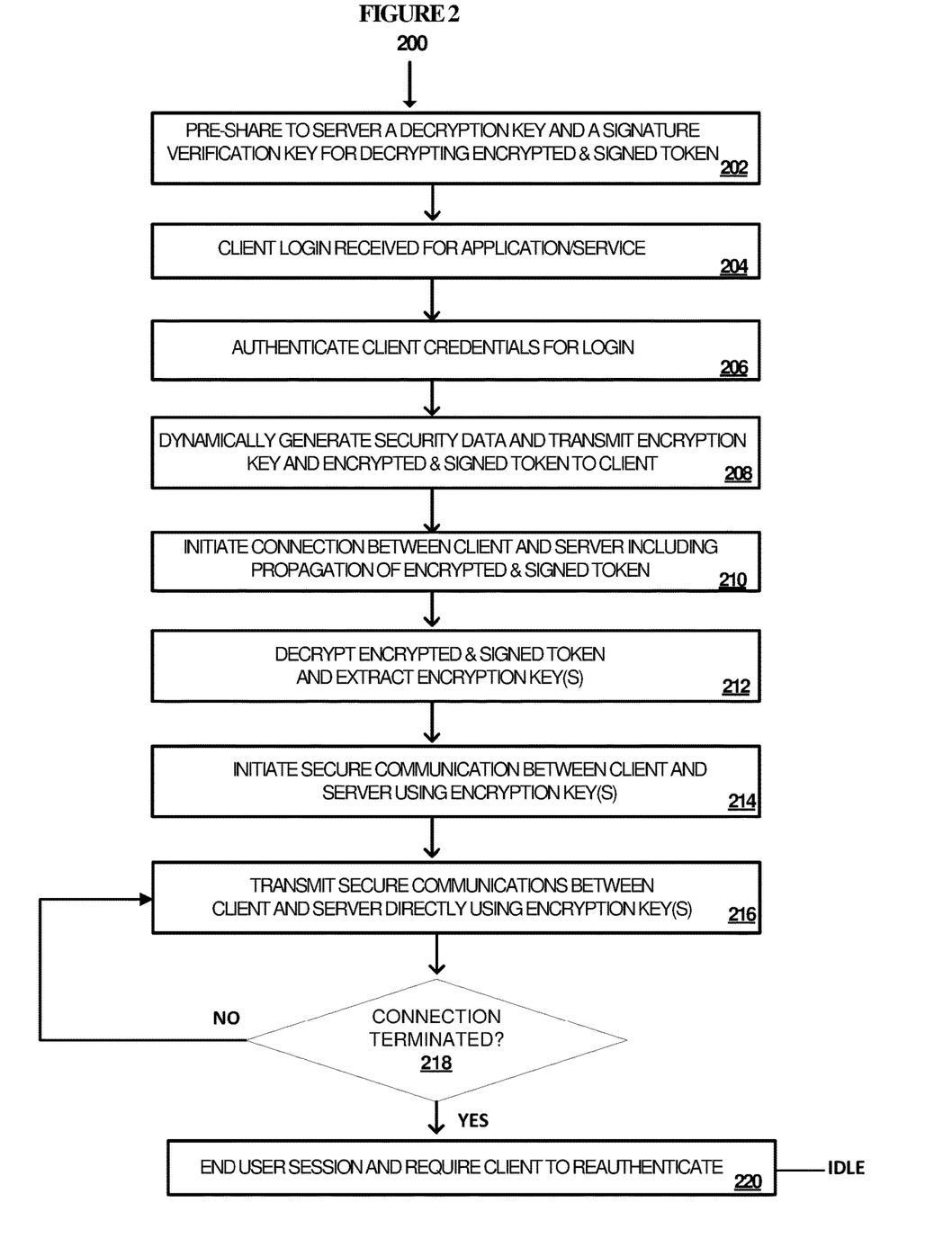
FIG. 2 illustrates an exemplary method related to processing operations for initiation and management of a secure communication session between client(s) and server(s), with which aspects of the present disclosure may be practiced.

FIG. 2 illustrates an exemplary method 200 related to processing operations for initiation and management of a secure communication session between client(s) and server(s), with which aspects of the present disclosure may be practiced. Processing operations described in method 200 may be executed by components described in process flow 100 (FIG. 1), where the detailed description of process flow 100 supports and supplements the recited processing operations in method 200. Interfacing and communication between exemplary components, such as those described in process flow 100, are known to one skilled in the field of art. For example, data requests and responses may be transmitted between applications/services to enable specific applications/services to process data retrieved from other applications/services. This includes application of encryption/decryption protocols to secure and decrypt data for interfacing between exemplary components. Formatting for such communication may vary according to programmed protocols implemented by developers without departing from the spirit of this disclosure.

As an example, method 200 may be executed across an exemplary computing system 401 (or computing systems) as described in the description of FIG. 4. Exemplary components, described in method 200, may be hardware and/or software components, which are programmed to execute processing operations described herein. Operations performed in method 200 may correspond to operations executed by a system and/or service that execute computer programs, software agents, intelligent bots, application programming interfaces (APIs), neural networks and/or machine-learning processing, among other examples. In some examples, processing operations described in method 200 may be executed by one or more applications/services associated with a web service that has access to a plurality of application/services, devices, knowledge resources, etc. In one instance, processing operations described in method 200 may be implemented by one or more components connected over a distributed network.

Method 200 begins at processing operation 202, where an authentication service pre-shares decryption and signature verifications keys with a server. The pre-shared decryption and signature verifications keys are utilized for decrypting an encrypted and signed token that is subsequently received by a server component when a client authenticates with an application/service hosted by the server component. In at least one example, the authentication service is configured to dynamically generate decryption and/or signature verification keys prior to client authentication processing. As such, pre-share decryption and signature verification keys may be applicable to validation of one or more connecting clients. However, as referenced in the foregoing description, some alternative examples may correlate dynamically generated decryption and signature verification keys with a specific client authentication scenario.

Flow of method 200 may proceed to processing operation 204, where client login data is received for login to an application/service. As identified in the foregoing description, including the description of process flow 100 (FIG. 1), client authentication information may be propagated from a client component (e.g., a programmed client device) to an authentication component (e.g., authentication service), for example, when a client logs into an application/service and/or a software application platform. As a non-limiting example, a user may be executed an SSO login to a plurality of applications/services offered by a provider.

Flow may proceed to processing operation 206, where client credentials for login are authenticated. Processing for authenticating client credentials (e.g., client authentication information) has been previously referenced in the description of process flow 100 (authentication component 102) and are known to one skilled in the field of art. For example, an authentication service may authenticate a client for access to an application/service that is hosted by one or more servers.

At processing operation 208, the authentication service dynamically generates security data for data transmission and issues portions of the generated security data to a client component and a server component. Based on a result where a user is authenticated (e.g., client authentication information validated), the authentication service is configured to: 1) dynamically generate one or more encryption keys is usable for securing data transmission between a client device and one or more server devices; and 2) dynamically generate an encrypted and signed token (e.g., signed JWE token) for client authentication to an application/service associated with a server component. Such data items, as well as decryption and signature verification keys for decrypting an encrypted and signed token, comprise the generated security data. In some examples, signing of a token is an optional added layer of security that may or may not be required to enable processing described herein. In examples where signing is not required, pre-sharing of key data with a server component may only require transmission of a decryption key for decrypting an encrypted token. In any case, processing operation 208 comprises transmitting the one or more encryption keys to the client component (e.g., client device) along with the encrypted and signed token. That is, the one or more encryption keys are pre-shared with the client component, where the client component may utilize the one or more encryption keys to conduct secure communications directly with the server component by decrypting secure communications received from the server component and encrypting communications that are transmitted to the server component.

Flow of method 200 may proceed to processing operation 210, where a connection is initiated between the client component and the server component. Initiation (processing operation 208) of a connection comprises forwarding, in a data request, the encrypted and signed token to the server component. As the encrypted token is signed and encrypted and the client component does not possess the decryption keys, the contents of the encrypted token, including the fact that the encryption key is provided in a claim, is opaque to the client.

At processing operation 212, the server component is configured to utilize the pre-shared decryption and signature verification keys to decrypt the encrypted and signed token. Processing operation 212 comprises parsing the decrypted token and extracting, from the payload (e.g., from a claim in the payload) the encryption key that is usable for securing data transmission between a client device and one or more server devices.

Flow may proceed to processing operation 214, where a secure communication is initiated between the client component and the server component using the encryption key that is extracted from the decrypted token. In one non-limiting example, a communication data channel may be launched that is specific to communication between an authenticated client (or group of authenticated clients) and one or more servers. As referenced in the foregoing, one non-limiting example is that where the client device is a gaming console that is communicating with a server device of a distributed gaming service. In such an example, a secure communication may correspond with an online multiplayer game (e.g., session) provided by the distributed gaming service, where the data channel may be specific to the interactions of a specific client device in the online multiplayer game or alternatively may provide communications of a plurality of authenticated client devices engaging in the online multiplayer game.

At processing operation 216, the server component transmits one or more secure communications directly to one or more clients utilizing the encryption key to secure the communication. Communications between the client and the server may be two-way, where the shared encryption keys can be utilized to both transmit secure communications and decrypt secured communications that are received. This type of processing may continue until a session of an authenticated client is no longer active.

Flow of method 200 may proceed to decision operation 218, where it is determined whether a client connection with an application/service is terminated. As referenced above, a client component may disconnect from the distributed gaming service voluntarily or be logged out automatically after a predetermined idle period. In some alternative examples, associated encryption keys and/or encrypted tokens may also be pre-determined to expire at a designated point in time to avoid unintended access to client accounts and server interaction. In any case, the client component may be required to reauthenticate when it is disconnected from a server component. This is a trigger for dynamic generation of a new encryption key and/or encrypted token, enabling the server to securely communicate with the client in a new session. In examples where the it is determined that the connection has not terminated, flow of decision operation 218 branches NO, and processing of method 200 returns to processing operation 216 where additional secure communications may be transmitted between a client and a server. In examples where it is determined that a connection between a client and an application/service (e.g., via a server component) has terminated, flow of decision operation 218 branches YES, and processing of method 200 proceeds to processing operation 220.

At processing operation 220, a client session with an application/service is ended and a client is required to reauthenticate to re-gain access to the application/service. Processing operation 220 may further comprise terminating secure communications between the client and server and/or terminating a data channel utilized for secure communication. As referenced in the foregoing description, encryption keys and tokens may be dynamically generated, for example, in response to authentication of client authentication information. In the case where a user logs back into an application/service and the client is authenticated, the authentication service is configured to dynamically generate a new encryption key and a new encrypted (and signed) token. This helps minimize unintended access that may compromise a client device and/or server.

Figure 3:
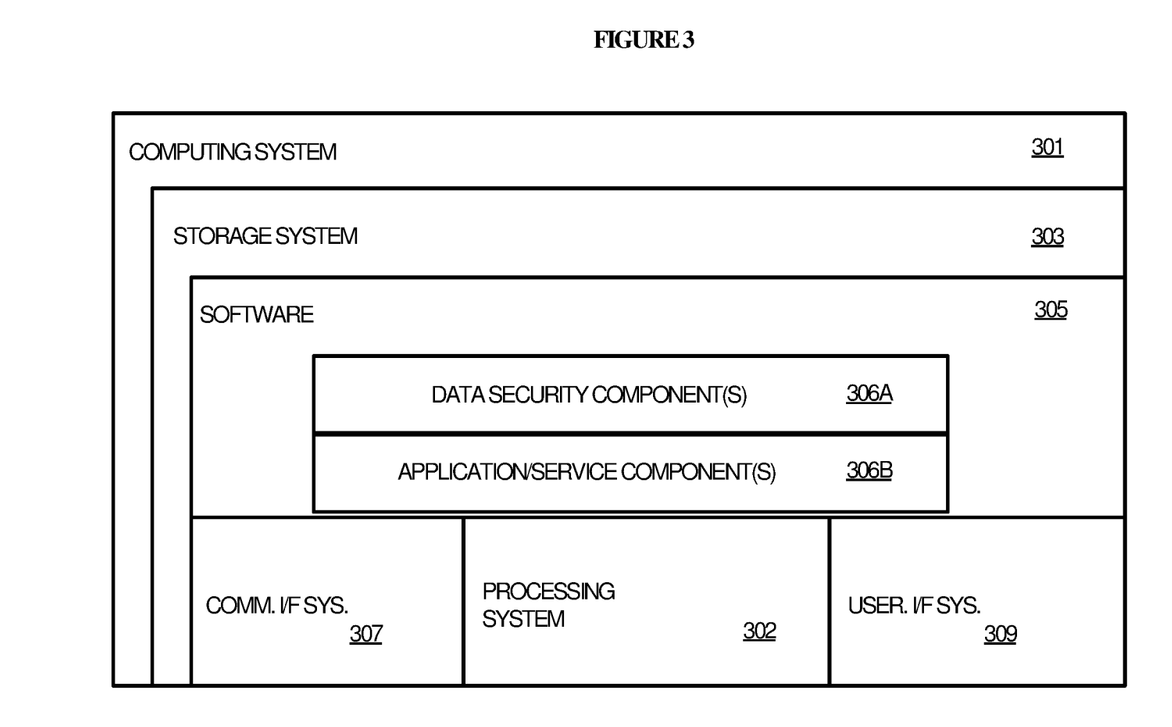
FIG. 3 illustrates a computing system suitable for implementing processing operations described herein related to initiation and management of a secure communication session between computing devices, with which aspects of the present disclosure may be practiced.

FIG. 3 illustrates a computing system 301 suitable for implementing processing operations described herein related to initiation and management of a secure communication session between computing devices, with which aspects of the present disclosure may be practiced. Computing system 301 may be implemented as a single apparatus, system, or device or may be implemented in a distributed manner as multiple apparatuses, systems, or devices. For example, computing system 301 may comprise one or more computing devices that execute processing for applications and/or services over a distributed network to enable execution of processing operations described herein over one or more services. Computing system 301 may comprise a collection of devices executing processing for front-end applications/services, back-end applications/service or a combination thereof. Computing system 301 comprises, but is not limited to, processing system 302, storage system 303, software 305, communication interface system 307, and user interface system 309. Processing system 302 is operatively coupled with storage system 303, communication interface system 307, and user interface system 309. Non-limiting examples of computer system 301 comprise but are not limited to: smart phones, laptops, tablets, PDAs, desktop computers, servers, smart computing devices including television devices and wearable computing devices, e-reader devices, gaming consoles and conferencing systems, among other non-limiting examples.

Processing system 302 loads and executes software 305 from storage system 303. Software 305 includes one or more software components 306 that are configured to initiate and manage a communication channel that is used to enable secure communication between a client and a server, thereby executing processing operations as described herein to achieve that. In some examples, computing system 301 may be a gaming console utilized to access a video game, which may or may not be accessed via a network connection. When executed by processing system 302, software 305 directs processing system 302 to operate as described herein for at least the various processes, operational scenarios, and sequences discussed in the foregoing implementations. Computing system 301 may optionally include additional devices, features, or functionality not discussed for purposes of brevity. Computing system 301 may further be utilized to execute exemplary process flow 100 (FIG. 1) as well as method 200 (FIG. 2), where processing operations may be specifically executed to initiate and manage a communication channel that is used to enable secure communication between a client and a server.

Referring still to FIG. 3, processing system 302 may comprise processor, a micro-processor and other circuitry that retrieves and executes software 305 from storage system 303. Processing system 302 may be implemented within a single processing device but may also be distributed across multiple processing devices or sub-systems that cooperate in executing program instructions. Examples of processing system 302 include general purpose central processing units, microprocessors, graphical processing units, application specific processors, sound cards, speakers and logic devices, gaming devices as well as any other type of processing devices, combinations, or variations thereof.

Storage system 303 may comprise any computer readable storage media readable by processing system 302 and capable of storing software 305. Storage system 303 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 303 may also include computer readable communication media over which at least some of software 305 may be communicated internally or externally. Storage system 303 may be implemented as a single storage device but may also be implemented across multiple storage devices or sub-systems co-located or distributed relative to each other. Storage system 403 may comprise additional elements, such as a controller, capable of communicating with processing system 302 or possibly other systems.

Software 305 may be implemented in program instructions and among other functions may, when executed by processing system 302, direct processing system 302 to operate as described with respect to the various operational scenarios, sequences, and processes illustrated herein. For example, software 305 may include program instructions for data security component(s) 306*a* that comprise: client component(s); server component(s), authentication component (s); or any combination thereof. Software 305 may further comprise application/service component(s) 306*b* (e.g., of a software application platform), and other service-based components including interaction with third-party applications/services, as described in the foregoing description. For example, software may comprise programmed instructions that enable specific components of the computer system 301 to execute processing operations described herein including but not limited to: dynamic generation of encrypted tokens; dynamical generation of encryption/decryption keys; transmission of data between a client, an authentication, a server, or any combination thereof; decryption of an encrypted token; establishing a secure communication channel between a client and server; encryption/decryption of secure communications between a client/server; managing an authenticated state of a user including lifetime of a token and/or encryption key; and managing interactions between a client and a service including graphical user interface representations, among other examples.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 305 may include additional processes, programs, or components, such as operating system software, virtual machine software, or other application software. Software 305 may also comprise firmware or some other form of machine-readable processing instructions executable by processing system 302.

In general, software 305 may, when loaded into processing system 302 and executed, transform a suitable apparatus, system, or device (of which computing system 301 is representative) overall from a general-purpose computing system into a special-purpose computing system customized to process data and respond to queries. Indeed, encoding software 305 on storage system 303 may transform the physical structure of storage system 303. The specific transformation of the physical structure may depend on various factors in different implementations of this description. Examples of such factors may include, but are not limited to, the technology used to implement the storage media of storage system 303 and whether the computer-storage media are characterized as primary or secondary storage, as well as other factors.

For example, if the computer readable storage media are implemented as semiconductor-based memory, software 305 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 307 may include communication connections and devices that allow for communication with other computing systems (not shown) over communication networks (not shown). Communication interface system 307 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 309 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 309. In some cases, the input and output devices may be combined in a single device, such as a display capable of displaying images and receiving touch gestures. The aforementioned user input and output devices are well known in the art and need not be discussed at length here.

User interface system 309 may also include associated user interface software executable by processing system 302 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein including establishing a graphical user interface for a secure communication channel that enables direct communication between two or more computing devices (e.g., a client and a server and/or other client devices authenticated to communicate in a secure communication channel). User interface system 309 comprises a graphical user interface that presents graphical user interface elements representative of any point in the processing described in the foregoing description including processing operations described in process flow 100 (FIG. 1) and method 200 (FIG. 2). A graphical user interface of user interface system 1109 may further be configured to display graphical user interface elements (e.g., data fields, menus, links, graphs, charts, data correlation representations and identifiers, etc.) that are representations generated from processing described in the foregoing description. For example, a graphical user interface may enable a client device to login to a gaming platform or application/service and send/receive messages securely either directly to a server or to other client devices that are authenticated and included in a secure communication session (e.g., over a secure data channel).

Communication between computing system 301 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A computer-implemented method comprising:
generating, at a computing device, a decryption key;
transmitting, by the computing device, the decryption key to a server device of an application or service;
detecting access to the application or service by a client device;
in response to detecting the access to the application or service by the client device;
generating, at the computing device, an encryption key configured for securing communications for a secure communication channel between the server device of the application or service and the client device, and
generating, at the computing device, an encrypted token that the decryption key is used to decrypt and that is usable to gain access to the secure communication channel of the application or service, wherein the generating comprises integrating the encryption key within a payload of the encrypted token; and
forwarding the encrypted token to the client device of the application or service to enable launch of the secure communication channel of the application or service between the client device and the server device.

2. The computer-implemented method of claim 1, wherein the application or service is a distributed gaming service.

3. The computer-implemented method of claim 1, wherein the encryption key is included as a claim in the payload of the encrypted token.

4. The computer-implemented method of claim 1, wherein the generating of the encrypted token further comprises signing the encrypted token.

5. The computer-implemented method of claim 4, wherein the encrypted token is a signed JSON web encryption (JWE) token.

6. The computer-implemented method of claim 4, wherein the computing device is associated with an authentication service.

7. A computer-implemented method comprising:
generating, at a computing device, a decryption key;
transmitting, by the computing device, the decryption key to a server device of an application or service;
authenticating, by the computing device, a user account for access to the application or service based on login credentials provided by a client device seeking access to the application or service;
in response to an authentication of the user account:
generating, at the computing device, an encryption key configured for securing communications for a secure communication channel between the server device and the client device, and
generating, at the computing device, an encrypted token that the decryption key is used to decrypt and that is usable to gain access to the application or service, wherein the generating comprises integrating the encryption key within a payload of the encrypted token; and
forwarding the encrypted token to the client device of the application or service to enable launch of the secured communication channel of the application or service between the client device and the server device.

8. The computer-implemented method of claim 7, wherein the encryption key is included as a claim in the payload of the encrypted token.

9. The computer-implemented method of claim 7, wherein the generating of the encrypted token further comprises signing the encrypted token.

10. The computer-implemented method of claim 9, wherein the encrypted token is a signed JSON web encryption (JWE) token.

11. The computer-implemented method of claim 7, further comprising: in response to the authentication of the user account, pre-sharing the encryption key with the client device.

12. The computer-implemented method of claim 7, wherein data within the encrypted token, including the encryption key, is opaque to the client device, and wherein the server device accesses the encryption key by decrypting the encrypted token using the decryption key that is pre-shared with the server device.

13. The computer-implemented method of claim 7, wherein the computing device is associated with an authentication service.

14. The computer-implemented method of claim 7, wherein the client device is a gaming console and wherein the application or service is a distributed gaming service.

15. A system comprising:
    at least one processor; and
    a memory, operatively connected with the at least one processor, storing computer-executable instructions that, when executed by the at least one processor, causes the at least one processor to execute a method that comprises:
       generating a decryption key;
       transmitting the decryption key to a server device of an application or service;
       authenticating a user account for access to the application or service based on login credentials provided by a client device seeking access to the application or service;
       in response to an authentication of the user account:
          generating, at a computing device, an encryption key configured for securing communications for a secure communication channel between the server device and the client device, and
          generating an encrypted token that the decryption key is used to decrypt and that is usable to gain access to the application or service, wherein the generating comprises integrating the encryption key within a payload of the encrypted token; and
       forwarding the encrypted token to the client server device of the application or service to enable launch of the secured communication channel of the application or service between the client device and the server device.

16. The system of claim 15, wherein the encryption key is included as a claim in the payload of the encrypted token.

17. The system of claim 15, wherein the generating of the encrypted token further comprises signing the encrypted token.

18. The system of claim 17, wherein the encrypted token is a signed JSON web encryption (JWE) token.

19. The system of claim 15, wherein the method, executed by the at least one processor, further comprises: in response to the authentication of the user account, pre-sharing the encryption key with the client device.

20. The system of claim 15, wherein the system is associated with an authentication service.

\* \* \* \* \*